(12) United States Patent
Trainin et al.

(10) Patent No.: US 11,784,701 B2
(45) Date of Patent: Oct. 10, 2023

(54) APPARATUS, SYSTEM AND METHOD OF BEAM TRACKING

(71) Applicant: INTEL IP CORPORATION, Santa Clara, CA (US)

(72) Inventors: Solomon B. Trainin, Haifa (IL); Assaf Kasher, Haifa (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 111 days.

(21) Appl. No.: 17/120,483

(22) Filed: Dec. 14, 2020

(65) Prior Publication Data

US 2021/0167838 A1 Jun. 3, 2021

Related U.S. Application Data

(63) Continuation of application No. 15/556,675, filed as application No. PCT/US2015/037087 on Jun. 23, 2015, now Pat. No. 10,879,989.

(60) Provisional application No. 62/144,953, filed on Apr. 9, 2015.

(51) Int. Cl.
*H04B 7/08* (2006.01)
*H04B 7/06* (2006.01)
*H04W 16/28* (2009.01)
*H04W 28/16* (2009.01)

(52) U.S. Cl.
CPC ........... *H04B 7/088* (2013.01); *H04B 7/0695* (2013.01); *H04W 16/28* (2013.01); *H04W 28/16* (2013.01)

(58) Field of Classification Search
CPC ..... H04B 7/088; H04B 7/0695; H04W 16/28; H04W 28/16
See application file for complete search history.

(56) References Cited

U.S. PATENT DOCUMENTS

| 10,879,989 B2 | 12/2020 | Trainin et al. |
| 2002/0120740 A1 | 8/2002 | Ho et al. |
| 2006/0056345 A1* | 3/2006 | Marinier ............ H04B 7/0408 370/339 |

(Continued)

FOREIGN PATENT DOCUMENTS

WO 2014074894 5/2014

OTHER PUBLICATIONS

IEEE Std 802.11™—2012. IEEE Standard for Information technology - Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Alex Skripnikov
*Assistant Examiner* — Wilfred Thomas
(74) *Attorney, Agent, or Firm* — Shichrur & Co.

(57) ABSTRACT

Some demonstrative embodiments include apparatuses, devices, systems and methods of beamforming. For example, a responder station may process a received Beam Refinement Protocol (BRP) request including a beam tracking request from an initiator station; and select whether or not to transmit a BRP response including beam tracking feedback, in response to the BRP request, based on a comparison between a time period and a BRP tracking time limit, the time period being based on a timing of the BRP request and a timing of the BRP response.

21 Claims, 4 Drawing Sheets

(56) References Cited

U.S. PATENT DOCUMENTS

| | | |
|---|---|---|
| 2010/0159845 A1 | 6/2010 | Kaaja et al. |
| 2010/0214169 A1 | 8/2010 | Kafle |
| 2011/0002373 A1 | 1/2011 | Jeon |
| 2011/0211490 A1 | 9/2011 | Nikula et al. |
| 2012/0009880 A1* | 1/2012 | Trainin ............... H04L 1/20 455/67.11 |
| 2012/0287797 A1* | 11/2012 | Basson ............ H04W 16/28 370/252 |
| 2012/0294255 A1 | 11/2012 | Seok et al. |
| 2013/0089000 A1 | 4/2013 | Hansen et al. |
| 2013/0122820 A1 | 5/2013 | Horio et al. |
| 2013/0315219 A1* | 11/2013 | Cheong ........... H04L 27/2613 370/338 |
| 2013/0315325 A1 | 11/2013 | Wang et al. |
| 2013/0329718 A1 | 12/2013 | Liu et al. |
| 2014/0016567 A1* | 1/2014 | Lu ..................... H04W 72/12 370/329 |
| 2014/0029453 A1 | 1/2014 | Trainin et al. |
| 2014/0198692 A1* | 7/2014 | Torab Jahromi ...... H04W 74/04 370/310 |
| 2014/0301374 A1 | 10/2014 | Malkawi et al. |
| 2014/0376535 A1* | 12/2014 | Murakami .......... H04B 7/024 370/338 |
| 2015/0023272 A1* | 1/2015 | Choi ................ H04L 25/0226 370/329 |
| 2015/0103756 A1 | 4/2015 | Sinha |
| 2015/0139207 A1* | 5/2015 | Seok ................ H04W 52/0225 370/338 |
| 2015/0230263 A1* | 8/2015 | Roy .................... H04B 7/0695 455/452.2 |
| 2015/0289147 A1 | 10/2015 | Lou et al. |
| 2015/0333894 A1 | 11/2015 | Wng et al. |
| 2015/0382171 A1 | 12/2015 | Roy et al. |
| 2016/0119043 A1* | 4/2016 | Rajagopal ............ H04B 7/0695 370/329 |
| 2016/0259041 A1* | 9/2016 | Tan ....................... G01S 13/003 |
| 2017/0064583 A1* | 3/2017 | Roy .................. H04W 36/0009 |
| 2017/0170937 A1* | 6/2017 | Chun .................. H04L 5/0023 |
| 2017/0171878 A1* | 6/2017 | Chun ............... H04W 72/0453 |
| 2021/0203399 A1 | 7/2021 | Trainin et al. |

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Preliminary Report on Patentability for PCT /US2015/037087, dated Oct. 19, 2017, 7 pages.

International Search Report and Written Opinion for PCT/US2015/037087, dated Jan. 8, 2016, 10 pages.

Office Action for U.S. Appl. No. 15/556,675, dated Apr. 16, 2020, 18 pages.

Notice of Allowance for U.S. Appl. No. 15/556,675, dated Aug. 24, 2020, 9 pages.

Office Action for U.S. Appl. No. 17/200,851, dated Oct. 26, 2022, 36 pages.

Office Action for U.S. Appl. No. 17/200,851, dated Mar. 29, 2023, 30 pages.

Advisory Action for U.S. Appl. No. 17/200,851, dated Jun. 9, 2023, 7 pages.

* cited by examiner

APPARATUS, SYSTEM AND METHOD OF BEAM TRACKING

CROSS REFERENCE

This application claims the benefit of and priority from U.S. Provisional Patent Application No. 62/144,953 entitled "Apparatus, System and Method of Beamforming", filed Apr. 9, 2015, the entire disclosure of which is incorporated herein by reference.

TECHNICAL FIELD

Embodiments described herein generally relate to beamforming.

BACKGROUND

A wireless communication network in a millimeter-wave band may provide high-speed data access for users of wireless communication devices.

A beamforming procedure may be configured to steer a first directional antenna of a first wireless communication device, e.g., a beamforming initiator (BI), and a second directional antenna of a second wireless communication device, e.g., a beamforming responder (BR). The beamforming procedure may be performed, for example, to establish a high throughout communication link between the BI and the BR, e.g., at an acceptable communication range between the BR and the BI.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
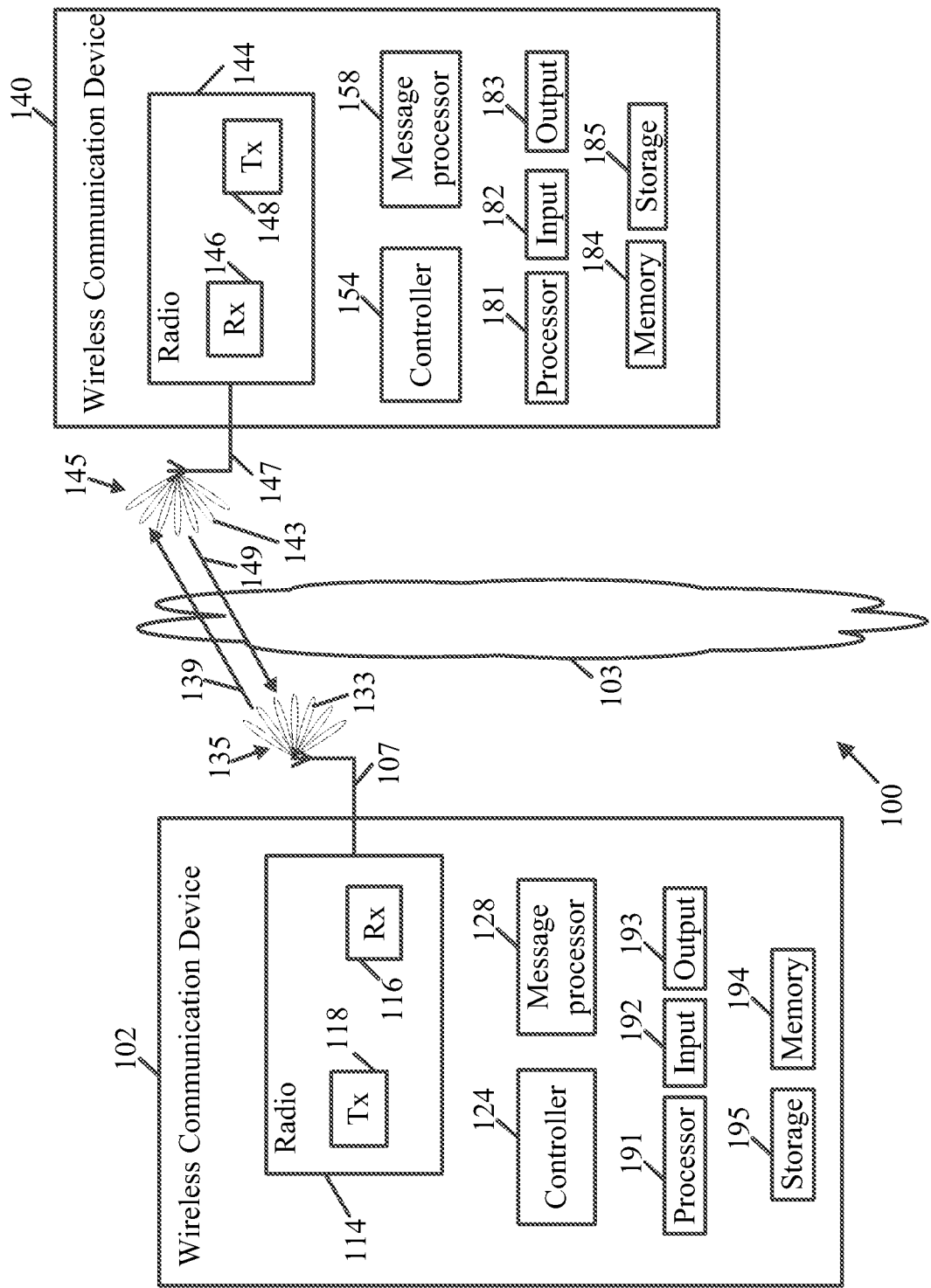
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a sensor device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; IEEE802.11ac-2013 ("*IEEE P802.11ac-2013, IEEE Standard for Information Technology—Telecommunications and Information Exchange Between Systems—Local and Metropolitan Area Networks Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and*

*Physical Layer (PHY) Specifications—Amendment 3: Enhancements for Very High Throughput in the 60 GHz Band"*, 28 December, 2012); IEEE-802.11REVmc (*"IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)*) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.5, Aug. 4, 2014*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network, and/or any other network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include and/or perform the functionality of one or more STAs. For example, device 102 may include at least one STA, and/or device 140 may include at least one STA.

In some demonstrative embodiments, devices 102 and/or 140 may include and/or perform the functionality of one or more DMG STAs. For example, device 102 may include at least one DMG STA, and/or device 140 may include at least one DMG STA.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, devices 102 and/or 140 may perform the functionality of any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and/or 140 may include a mobile device or a non-mobile, e.g., a static, device. For example, devices 102 and/or 140 may include, for example, a UE, an MD, a STA, an AP, a PC, a desktop computer, a mobile computer, a laptop computer, an Ultrabook™ computer, a notebook computer, a tablet computer, an Internet of Things (IoT) device, a sensor device, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments WM 103 may include any other directional channel.

In other embodiments, WM 103 may include any other additional or alternative type of channel over any other frequency band.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145.

In some demonstrative embodiments, devices 102 and/or 140 may select a pair of beams including a first beam direction of the plurality of beam directions 135, e.g., including a direction 133, and a second beam direction of the plurality of beam directions 145, e.g., including a direction 143, to communicate between devices 102 and 140, for example, via a mmWave wireless communication link and/or any other link.

In some demonstrative embodiments, device 102 may include a controller 124, and/or device 140 may include a controller 154. Controllers 124 and/or 154 may be configured to perform one or more functionalities, communications, operations and/or procedures, for example, including one or more beamforming functionalities, communications, operations and/or procedures between devices 102 and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, system 100 may include a beamforming initiator (BI) and a beamforming responder (BR) to perform beamforming between the BI and the BR. For example, wireless communication device 102 may perform the functionality of the BI, and/or wireless communication device 140 may perform the functionality of the BR.

In other embodiments, wireless communication device 140 may perform the functionality of the BI, and/or wireless communication device 102 may perform the functionality of the BR.

In some demonstrative embodiments, devices 102 and/or 140 may perform a Beamforming procedure (also refereed to as "beamforming training protocol") including a Sector level sweep (SLS) phase, e.g., including, for example, an Initiator Sector Sweep (ISS), which may include, for example, a sector sweep performed, for example, by the Beamforming initiator; and/or a responder sector sweep (RSS), which may include, for example, a sector sweep performed, for example, by the Beamforming responder. The RSS may, for example, follow the ISS.

In some demonstrative embodiments, devices 102 and/or 140 may opt to perform a Beam Refinement Phase (also referred to as "Beam Refinement Protocol") (BRP), e.g., following the SLS phase.

Some demonstrative embodiments are described herein with respect to a BRP, which may be performed after a SLS phase of a beamforming procedure. However, in other embodiments, a BRP may be performed as part of any other phase and/or procedure.

In some demonstrative embodiments, devices 102 and/or 140 may exchange a plurality of BRP frames during the BRP. For example, device 102 may send one or more BRP frames 139, e.g., a plurality of BRP frames 139, to device 140, and/or device 140 may send one or more BRP frames 149, e.g., a plurality of BRP frames 149, to device 102.

In some demonstrative embodiments, one of devices 102 and/or 140 may perform the functionality of a BRP tracking initiator ("BRP initiator"), e.g., to initiate the exchange of BRP frames 139 and 149; and/or another one of devices 102 and/or 140 may perform the functionality of a BRP tracking responder ("BRP responder").

In one example, device 102 may perform the functionality of the BRP initiator and/or device 140 may perform the functionality of the BRP responder. In another example, device 140 may perform the functionality of the BRP initiator and/or device 102 may perform the functionality of the BRP responder.

In some demonstrative embodiments, a BRP frame of BRP frames 139 and/or 149, e.g., each BRP frame except a first BRP frame or only some of the frames, may be both a request for training and a response for training.

In some demonstrative embodiments, devices 102 and/or 140 may continue the training process, for example, by continuing to perform the BRP, e.g., until at least one of devices 102 and 140, e.g., both devices 102 and 140, do not require further beamforming training.

In some demonstrative embodiments, the Beam Refinement Protocol (BRP) may implement a beam tracking mechanism, which may allow, for example, ongoing refinement of an established beam link during data traffic.

In some demonstrative embodiments, a first wireless station, e.g., a wireless station implemented by one of devices 102 and/or 140, may perform the functionality of a beam tracking initiator, e.g., to send a BRP tracking request ("BRP request") frame including a beam tracking request; and a second wireless station, e.g., a wireless station implemented by another one of devices 102 and/or 140 may perform the functionality of a beam tracking responder, e.g., to send a BRP tracking response ("BRP response") frame including beam tracking feedback.

In one example, device 102 may perform the functionality of the beam tracking initiator and/or device 140 may perform the functionality of the beam tracking responder.

In some demonstrative embodiments, a BRP request may be communicated in the form of a BRP frame, e.g., from the beam tracking initiator to the beam tracking responder. The BRP frame may include a Physical Layer Convergence Protocol (PLCP) Protocol Data Unit (PPDU) including a request ("request for beam tracking") to the beam tracking responder to transmit beam tracking feedback information ("beam tracking feedback").

In one example, controller 124 may be configured to cause an initiator station, e.g., a beam tracking initiator, for example, a wireless STA implemented by device 102, to generate and transmit a BRP frame including the request for beam tracking, e.g., as described below.

In one example, controller 154 may be configured to cause a responder station, e.g., a beam tracking responder, for example, a wireless STA implemented by device 140, to process reception of the BRP frame including the request for beam tracking, e.g., as described below.

In some demonstrative embodiments, a BRP response may be communicated in the form of a BRP frame, e.g., from the beam tracking responder to the beam tracking initiator. The BRP frame may include a PPDU including the beam tracking feedback.

In one example, controller 154 may be configured to cause the responder station, e.g., the beam tracking responder, for example, the wireless STA implemented by device 140, to generate and transmit a BRP frame including the beam tracking feedback, e.g., as described below.

In one example, controller 124 may be configured to cause the initiator station, e.g., a beam tracking initiator, for example, the wireless STA implemented by device 102, to process reception of the BRP frame including the beam tracking feedback, e.g., as described below.

In some demonstrative embodiments, devices 102 and/or 140 may be configured to control, limit and/or restrict a time difference between a BRP request and a BRP response, e.g., in response to the BRP request, e.g., as described below.

In some demonstrative embodiments, the BRP response may be ready to be sent by the responder, for example, when the BRP request has been processed and ready to be sent, e.g., independently of any initiator sequence and/or in a separate link access.

In some demonstrative embodiments, a late BRP response, e.g., a BRP response received a long time period after the BRP request, may be inadequate, e.g., for use by the beam tracking initiator, for example, due to potential changes in link conditions. Accordingly, using beam tracking feedback of a late BRP response may lead, for example, to wrong antenna configuration and/or performance loss.

In some demonstrative embodiments, a BRP response may potentially be a late BRP response, for example, when the BRP response is sent in a separate link access. In other embodiments, a late BRP response may potentially occur in any other additional or alternative situations, implementations and/or scenarios.

In some demonstrative embodiments, construction of a responding BRP frame may take time, which may be, for example, longer than the transmit sequence of the beam tracking initiator. Accordingly, the responding BRP frame may not be sent in the transmit sequence.

Some demonstrative embodiments may be implemented, for example, at least with respect to a BRP tracking response, which may be sent by the beam tracking responder, for example, in a separate link access, e.g., separate from a channel access sequence of a link access in which a BRP request may be sent from the beam tracking initiator to the beam tracking responder. There is no known solution that may resolve this scenario. For example, at least this case may not be addressed by a current beam tracking mechanism of a current protocol and/or Specification, for example, the *IEEE 802.11ad-2012 Specification*.

In some demonstrative embodiments, a BRP response sent by a separate link access may be different, for example, from a BRP response, which may be sent inside a channel access sequence. For example, the time of the BRP response in the separate link access may be unpredictable, e.g., due to the separate link access.

In some demonstrative embodiments, devices 102 and/or 140 may be configured, for example, to provide timing control to validate a BRP tracking response to a BRP tracking request, and/or advertising of a timeout parameter, e.g., as described below.

In some demonstrative embodiments, providing the timing control to validate the BRP tracking response to a beam tracking request, and/or advertising the timeout parameter may, for example, resolve the issue of the unpredictable BRP response, e.g., as described below.

In some demonstrative embodiments, devices 102 and/or 140 may be configured to communicate and/or process BRP requests and/or BRP responses according to a scheme, which may be configured, for example, at least to resolve unpredictability of the BRP response to the beam tracking request, e.g., if the BRP response is sent by a separate link access, e.g., as described below.

In some demonstrative embodiments, devices 102 and/or 140 may be configured to communicate and/or process one or more BRP request frames and/or one or more BRP response frames, for example, based at least on a BRP tracking time limit (also referred to as "dot11BRPTrackingTimeLimit").

In some demonstrative embodiments, the BRP tracking time limit may be determined, defined and/or set by a wireless station, e.g., as described below.

In some demonstrative embodiments, the BRP tracking time limit may be determined, defined and/or set by the BRP tracking initiator and/or the BRP tracking responder, e.g., as described below.

In some demonstrative embodiments, the BRP tracking time limit may be negotiated between the BRP tracking initiator and/or the BRP tracking responder, e.g., as described below.

In some demonstrative embodiments, the BRP tracking time limit may be negotiated between first and second peer stations, for example, peer stations establishing a beamformed link (beam link), e.g., as described below.

In some demonstrative embodiments, a wireless station, e.g., the wireless station implemented by device 102 and/or the wireless station implemented by device 140, may be configured to communicate a message including a BRP tracking time limit value, e.g., as described below.

In some demonstrative embodiments, controller 124 may be configured to cause the wireless station implemented by device 102 to transmit a message including a first BRP tracking time limit value of the wireless station implemented by device 102, e.g., as described below.

In some demonstrative embodiments, controller 154 may be configured to cause the wireless station implemented by device 140 to transmit a message including a second BRP tracking time limit value of the wireless station implemented by device 140, e.g., as described below.

In some demonstrative embodiments, controller 124 may be configured to cause the wireless station implemented by device 102 to process the message from device 140 including the second BRP tracking time limit value, and to determine the BRP tracking time limit to be used, for example, in a BRP between devices 102 and 140, based on at least one of the first and second BRP tracking time limit values, e.g., as described below.

In some demonstrative embodiments, controller 124 may be configured to cause the wireless station implemented by device 102 to determine the BRP tracking time limit to be used, for example, in the BRP between devices 102 and 140, based on the first BRP tracking time limit value transmitted by device 102, e.g., as described below.

In some demonstrative embodiments, controller 124 may be configured to cause the wireless station implemented by device 102 to determine the BRP tracking time limit to be used, for example, in the BRP between devices 102 and 140, based on the second BRP tracking time limit value received from device 140, e.g., as described below.

In some demonstrative embodiments, controller 124 may be configured to cause the wireless station implemented by device 102 to determine the BRP tracking time limit to be used, for example, in the BRP between devices 102 and 140, based on a comparison between the first and second BRP tracking time limit values, e.g., as described below.

In some demonstrative embodiments, controller 154 may be configured to cause the wireless station implemented by device 140 to process the message from device 102 including the first BRP tracking time limit value, and to determine the BRP tracking time limit to be used, for example, in the BRP between devices 102 and 140, based on at least one of the first and second BRP tracking time limit values, e.g., as described below.

In some demonstrative embodiments, controller 154 may be configured to cause the wireless station implemented by device 140 to determine the BRP tracking time limit to be used, for example, in the BRP between devices 102 and 140, based on the second BRP tracking time limit value transmitted by device 140, e.g., as described below.

In some demonstrative embodiments, controller 154 may be configured to cause the wireless station implemented by device 140 to determine the BRP tracking time limit to be used, for example, in the BRP between devices 102 and 140, based on the first BRP tracking time limit value received from device 102, e.g., as described below.

In some demonstrative embodiments, controller 154 may be configured to cause the wireless station implemented by device 140 to determine the BRP tracking time limit to be used, for example, in the BRP between devices 102 and 140, based on a comparison between the first and second BRP tracking time limit values, e.g., as described below.

In some demonstrative embodiments, a wireless station, e.g., the wireless station implemented by device 102 and/or the wireless station implemented by device 140, may be configured to transmit the BRP tracking time limit value corresponding to the wireless station as part of a capabilities element, for example, a DMG Capabilities element, e.g., as described below.

In some demonstrative embodiments, a wireless station, e.g., the wireless station implemented by device 102 and/or the wireless station implemented by device 140, may be configured to transmit the BRP tracking time limit value corresponding to the wireless station as part of any other element, information element, field, subfield, and/or message.

Figure 2:
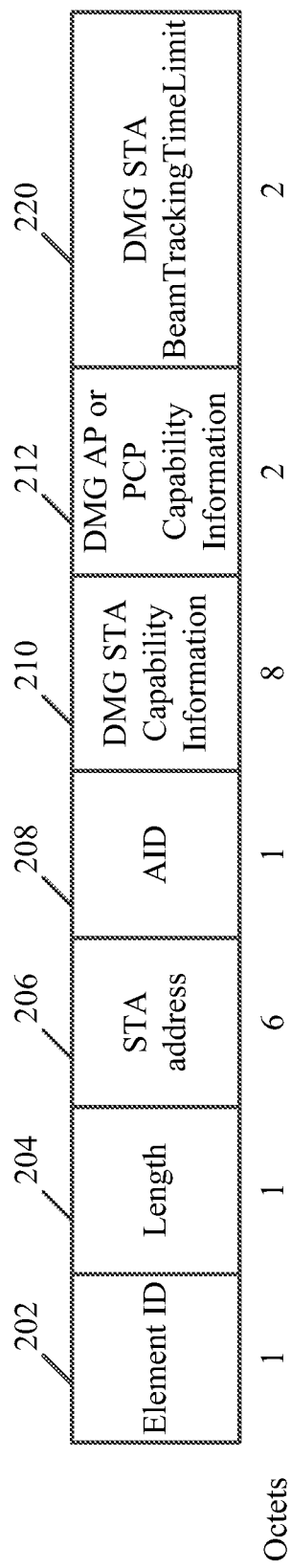
FIG. 2 is a schematic illustration of a capabilities element, in accordance with some demonstrative embodiments.

Reference is made to FIG. 2, which schematically illustrates a capabilities element 200, in accordance with some demonstrative embodiments.

In some demonstrative embodiments, capabilities element 200 may include a DMG Capabilities element, or any other capabilities element.

In some demonstrative embodiments, device 102 (FIG. 1) and/or device 140 (FIG. 1) may be configured to process transmission and/or reception of capabilities element 200.

In one example, device 102 (FIG. 1) may be configured to generate and transmit a message including capabilities element 200 including information corresponding to device 102 (FIG. 1), for example, during beam link establishment or at any other time.

In another example, device 102 (FIG. 1) may be configured to process reception of a message including capabilities element 200 including information corresponding to a sender of the message, e.g., device 140, for example, during beam link establishment or at any other time.

In one example, device 140 (FIG. 1) may be configured to generate and transmit a message including capabilities element 200 including information corresponding to device 140 (FIG. 1), for example, during beam link establishment or at any other time.

In another example, device 140 (FIG. 1) may be configured to process reception of a message including capabilities element 200 including information corresponding to a sender of the message, e.g., device 102 (FIG. 1), for example, during beam link establishment or at any other time.

In some demonstrative embodiments, capabilities element 200 may include a tracking time limit subfield 220, e.g., a DMG STA BeamTrakingTimeLimit subfield, e.g., including 2 bit octets or any other number of bits.

In some demonstrative embodiments, tracking time limit subfield 220 may include, for example, a BRP tracking time limit value, e.g., a value of dot11BeamTrackingTimeLimit, for example, corresponding to and/or set by a wireless station sending capabilities element 200.

In some demonstrative embodiments, tracking time limit subfield 220 may include the BRP tracking time limit value, for example, in units of 1 microsecond (us), or any other units.

In some demonstrative embodiments, tracking time limit subfield 220 may be, for example, defined by one or more attributes and/or parameters, e.g., as follows:
dot11BeamTrackingTimeLimit
OBJECT-TYPE
SYNTAX Unsigned32 (0 . . . 65535)
UNITS 1 us
MAX-ACCESS read-write
STATUS current
DESCRIPTION
"This is a control variable.
It is written by the MAC or SME.
Changes take effect as soon as practical in the implementation.
BRP tracking Initiator Time Limit (in units of 1 us)."
DEFVAL {10000}
::={dot11DMGBeamformingConfigEntry 11}

In some demonstrative embodiments, capabilities element 200 may also include an Element Identifier (ID) field 202, e.g., including 1 bit octet, a length field 204, e.g., including 1 bit octet, a STA address field 206, e.g., including 6 bit octets, an Association ID (AID) field 208, e.g., including 1 bit octet, a DMG STA Capability information field 210, e.g., including 2 bit octets, and/or a DMG AP or PCP STA Capability information field 212, e.g., including 2 bit octets.

In some demonstrative embodiments, first and second peer stations, e.g., the STA implemented by device 102 (FIG. 1) and/or the STA implemented by device 140 (FIG. 1), may negotiate a value of the BRP tracking time limit, e.g., the value of dot11BeamTrackingTimeLimit, to be used, for example, with respect to a beam link established between the peer stations.

In some demonstrative embodiments, a first STA, denoted STA A, and a second STA, denoted STA B, may determine the value of the BRP tracking time limit, e.g., the value of dot11BeamTrackingTimeLimit, to be used, for example, with respect to a beam link established between STA A and STA B, for example, based on a first BRP tracking time limit value ("DMG STA BeamTrackingTimeLimit (STA-A)") corresponding to the STA A, and a second BRP tracking time limit value ("DMG STA BeamTrackingTimeLimit (STA-B)") corresponding to the STA B. For example, the STA A may transmit a capabilities element, e.g., capabilities element 200, including the first BRP tracking time limit value; and/or the STA B may transmit a capabilities element, e.g., capabilities element 200, including the second BRP tracking time limit value.

In some demonstrative embodiments, the STA-A and the STA-B may include any of the peer STAs performing a Beam Tracking Time Limit negotiation procedure, e.g., in no particular order.

In some demonstrative embodiments, the wireless STA implemented by device 102 (FIG. 1) may perform the functionality of the STA A, and/or the wireless STA implemented by device 140 (FIG. 1) may perform the functionality of the STA B.

In some demonstrative embodiments, a STA may set the BRP tracking time limit value, e.g., the value in subfield 220, in a capabilities element, e.g., capabilities element 200, sent by the station to indicate whether or not the use of BRP tracking time limit is supported by the STA, and/or to indicate a preference of the BRP tracking time limit.

In one example, the STA may set the BRP tracking time limit value, e.g., the value in subfield 220, to a predefined value, e.g., "0" or any other value, to indicate that the use of BRP tracking time limit is not supported by the STA, and/or that the STA is not to use the BRP time tracking limit.

In one example, the STA may set the BRP tracking time limit value, e.g., the value in subfield 220, to a value within a predefined range of values, e.g., a value greater than zero and less than 65535 or any other range, to indicate a BRP tracking time limit of the STA, e.g., a BRP tracking time limit preferred by the STA.

In one example, the STA may set the BRP tracking time limit value, e.g., the value in subfield 220, to a predefined value, e.g., 65535 or any other value, to indicate that the STA has no preference with respect to the BRP tracking time limit, and/or that the BRP tracking time limit may be set to any value in the range.

In some demonstrative embodiments, the STA A and the STA B may determine the BRP tracking time limit, e.g., the value of dot11BeamTrackingTimeLimit, to be used, for example, with respect to a beam link established between the peer stations, e.g., as follows:

TABLE 1

| DMG STA BeamTrackingTimeLimit (STA-A) | DMG STA BeamTrackingTimeLimit (STA-B) | dot11BeamTrackingTimeLimit (STA-A) vs. dot11BeamTrackingTimeLimit (STA-B) | Result |
|---|---|---|---|
| 0 | 0 | NA | Beam tracking is not supported |
| >0 | 0 | NA | |
| 0 | >0 | NA | |
| >0 and <65535 | >0 and <65535 | >, = | dot11BeamTrackingTimeLimit (STA-A) |
| >0 and <65535 | >0 and <65535 | < | dot11BeamTrackingTimeLimit (STA-B) |
| 65535 | >0 and <65535 | NA | dot11BeamTrackingTimeLimit (STA-B) |
| >0 and <65535 | 65535 | NA | dot11BeamTrackingTimeLimit (STA-A) |
| 65535 | 65535 | NA | Default |

TABLE 1-continued

| DMG STA BeamTrackingTimeLimit (STA-A) | DMG STA BeamTrackingTimeLimit (STA-B) | dot11BeamTrackingTimeLimit (STA-A) vs. dot11BeamTrackingTimeLimit (STA-B) | Result |
|---|---|---|---|
| | | | dot11BeamTrackingTimeLimit value |

In some demonstrative embodiments, the value of the BRP tracking time limit may be communicated between peer STAs, for example, using capabilities element 200, e.g., as described above.

In other demonstrative embodiments, the value of the BRP tracking time limit value may be determined, set and/or defined by a PCP/AP STA, e.g., for one or more STAs associated with the PCP/AP STA, e.g., as described below.

In some demonstrative embodiments, while associated with AP/PCP STA, a STA may override the value of dot11BRPTrackingTimeLimit with the value of the BRP-TrackingTimeLimit subfield, for example, when the STA receives this element from the AP/PCP STA.

In some demonstrative embodiments, the AP/PCP STA may generate and transmit an operation element, e.g., a DMG operation element, including a BRP tracking time limit subfield.

In some demonstrative embodiments, a non-PCP/AP STA may receive the operation element from the PAP/AP STA, and may use a BRP tracking time limit value in accordance with the BRP tracking time limit subfield, for example, with respect to a beam link with another non-PCP/AP STA.

Figure 3:
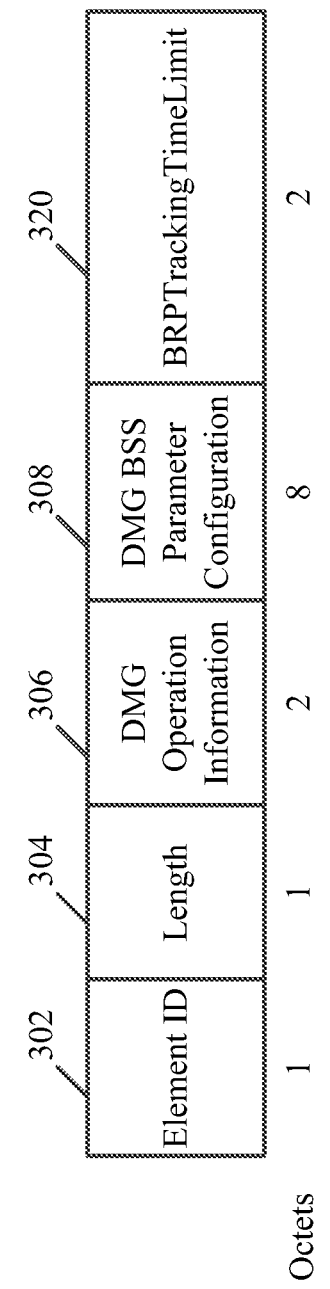
FIG. 3 is a schematic illustration of an operation element, in accordance with some demonstrative embodiments.

Reference is made to FIG. 3, which schematically illustrates an operation element 300, in accordance with some demonstrative embodiments.

In some demonstrative embodiments, operation element 300 may include a DMG Operation element, or any other operation element.

In some demonstrative embodiments, device 102 (FIG. 1) and/or device 140 (FIG. 1) may be configured to process transmission and/or reception of operation element 300.

In some demonstrative embodiments, operation element 300 may include a tracking time limit subfield 320, e.g., a DMG STA BeamTrakingTimeLimit subfield, e.g., including 2 bit octets.

In some demonstrative embodiments, tracking time limit subfield 320 may include, for example, a BRP tracking time limit value, e.g., a value of dot11BeamTrackingTimeLimit, for example, as may be set by a wireless station sending operation element 300, e.g., a PCP/AP STA.

In some demonstrative embodiments, operation element 320 may also include, for example, an element ID subfield 302, a length subfield 304, a DMG Operation Information subfield 306, and/or a DMG BSS Parameter Configuration subfield 308, and/or any other subfield.

Referring back to FIG. 1, in some demonstrative embodiments, controller 124 may be configured to cause an initiator station, e.g., a beam tracking initiator station implemented by device 102, to communicate and/or process one or more BRP frames, e.g., with a responder station, during a BRP, for example, based on a BRP tracking time limit, e.g., as described below.

In some demonstrative embodiments, controller 140 may be configured to cause a responder station, e.g., a beam tracking responder station implemented by device 140, to communicate and/or process one or more BRP frames, e.g., with the initiator station, during the BRP, for example, based on the BRP tracking time limit, e.g., as described below.

In some demonstrative embodiments, controller 124 may be configured to cause the initiator station to determine the BRP tracking time limit, for example, based at least on a BRP tracking time limit value transmitted by the initiator station, e.g., as described above.

In some demonstrative embodiments, controller 154 may be configured to cause the responder station to determine the BRP tracking time limit, for example, based at least on a BRP tracking time limit value transmitted by the responder station, e.g., as described above.

In some demonstrative embodiments, controller 124 may be configured to cause the initiator station to determine the BRP tracking time limit, for example, based at least on a BRP tracking time limit value received from the responder station, e.g., as described above.

In some demonstrative embodiments, controller 154 may be configured to cause the responder station to determine the BRP tracking time limit, for example, based at least on a BRP tracking time limit value received from the initiator station, e.g., as described above.

In some demonstrative embodiments, controller 124 may be configured to cause the initiator station to negotiate the BRP tracking time limit with the responder station, e.g., as described below.

In some demonstrative embodiments, controller 154 may be configured to cause the responder station to negotiate the BRP tracking time limit with the initiator station, e.g., as described below.

In some demonstrative embodiments, controller 124 may be configured to cause the initiator station to transmit a first capabilities element, e.g., capabilities element 200 (FIG. 2), including a first BRP tracking time limit value, e.g., in BRP tracking time limit subfield 220 (FIG. 2), e.g., as described above.

In some demonstrative embodiments, controller 154 may be configured to cause the responder station to process the first capabilities element including the first BRP tracking time limit value from the initiator station.

In some demonstrative embodiments, controller 154 may be configured to cause the responder station to transmit a second capabilities element, e.g., capabilities element 200 (FIG. 2), including a second BRP tracking time limit value, e.g., in BRP tracking time limit subfield 220 (FIG. 2), e.g., as described above.

In some demonstrative embodiments, controller 124 may be configured to cause the initiator station to process the second capabilities element including the second BRP tracking time limit value from the responder station.

In some demonstrative embodiments, controller 124 may be configured to cause the initiator station to determine the BRP tracking time limit based on the first and second BRP tracking time limit values; and/or controller 154 may be configured to cause the responder station to determine the BRP tracking time limit based on the first and second BRP tracking time limit values.

In some demonstrative embodiments, controllers 124 and/or 154 may be configured to determine the BRP tracking time limit based on a comparison between the first and second BRP tracking time limit values, e.g., according to Table 1 and/or according to any other conditions and/or criteria.

In some demonstrative embodiments, controller 124 may be configured to cause the initiator station to transmit a BRP request including a beam tracking request to the responder station.

In some demonstrative embodiments, controller 124 may be configured to cause the initiator station to transmit the BRP request, for example, if at least one of the following conditions is met:
  a time duration since transmission of a last BRP request to the responder station is greater than a sum of the BRP tracking time limit and a predefined time period, for example, a protocol inter-frame space (PIFS), e.g., a beam refinement protocol inter-frame space (BRPIFS); and
  a previous BRP response was received from the responder station.

In some demonstrative embodiments, controller 124 may be configured to cause the initiator station to transmit the BRP request, for example, only if at least one of these conditions is met. For example, controller 124 may be configured to select not to cause the initiator station, e.g., the beam tracking initiator station implemented by device 102, to transmit the BRP request, e.g., if both of these conditions are not met.

In other embodiments, controller 124 may be configured to cause the initiator station to transmit the BRP request based on any other additional or alternative conditions and/or criteria.

In some demonstrative embodiments, controller 154 may be configured to cause the responder station to process reception of the BRP request including the beam tracking request from the initiator station.

In some demonstrative embodiments, controller 154 may be configured to cause the responder station to prepare a beam tracking response, e.g., including measurement feedback, to be sent to the beam tracking request.

In some demonstrative embodiments, controller 154 may be configured to cause the responder station to select whether or not to transmit a BRP response including beam tracking feedback, e.g., the measurement feedback, in response to the BRP request, for example, based on a comparison between a time period and the BRP tracking time limit.

In some demonstrative embodiments, the time period may be based on a timing of the BRP request and a timing of the BRP response. For example, the time period may be between the timing of the BRP request and a timing of the BRP response.

In some demonstrative embodiments, the timing of the BRP request may be based, for example, on a Physical Layer (PHY) Receive (Rx) end (PHY-RXEND) indication primitive of the BRP request.

In some demonstrative embodiments, the timing of the BRP response may be based, for example, on a Physical Layer (PHY) Transmit (Tx) end (PHY-TXEND) indication primitive of the BRP response.

In some demonstrative embodiments, controller 154 may be configured to cause the responder station to transmit the BRP response, for example, when the time period is equal to or less than the BRP tracking time limit.

In some demonstrative embodiments, controller 154 may be configured to cause the responder station to select not to transmit the BRP response, for example, when the time period is longer than the BRP tracking time limit.

For example, controller 154 may be configured to cause the responder station to select not to transmit the BRP response, when a time period between the PHY-RXEND indication primitive of the BRP request and the PH-TXEND indication primitive of the BRP response is longer than the BRP tracking time limit.

In some demonstrative embodiments, controller 124 may be configured to cause the initiator station to select whether or not beam tracking feedback in the BRP response from the responder station is to be processed as a response to the beam tracking request, based on a comparison between a time period and a BRP tracking time limit.

In some demonstrative embodiments, the time period may be based on a timing of the BRP request and a timing of the BRP response.

In some demonstrative embodiments, the timing of the BRP request may be based, for example, on a PHY-TXEND indication primitive of the BRP request.

In some demonstrative embodiments, the timing of the BRP response is based on a PHY-RXEND indication primitive of the BRP response.

In some demonstrative embodiments, controller 124 may be configured to cause the initiator station to process the feedback in the BRP response, for example, when the time period is less than the BRP tracking time limit.

In some demonstrative embodiments, controller 124 may be configured to cause the initiator station to select to ignore the feedback in the BRP response, for example, when the time period is equal to or greater than the BRP tracking time limit.

In some demonstrative embodiments, controller 124 may be configured to cause the initiator station to determine a failure of the beam tracking request, when the BRP response is not received within the BRP tracking time limit.

In some demonstrative embodiments, controller 124 may be configured to cause the initiator station to operate during a BRP, and/or controller 154 may be configured to cause the responder station to operate during the BRP, for example, according to one or more, e.g., some or all, of the operations and/or conditions described below.

In some demonstrative embodiments, a beam tracking initiator may transmit to the beam tracking responder a PPDU requesting to transmit beam tracking, if at least one of the following conditions is met:
  the time duration since the last PPDU it transmitted to the beam tracking responder that requested transmit beam tracking is greater than dot11BeamTrackingTimeLimit plus BRPIFS,
  a BRP frame with the channel measurement feedback from the beam tracking responder has been received.

In some demonstrative embodiments, if the beam tracking initiator does not receive the expected feedback from the beam tracking responder within a time period that is less than dot11BeamTrackingTimeLimit of the last request, the beam tracking initiator may consider the beam tracking request as failed.

In some demonstrative embodiments, if the initiator receives the expected feedback from the responder within time that is greater than or equal to dot11BeamTrackingTimeLimit of the last request, the beam tracking initiator should ignore it.

In some demonstrative embodiments, the time of arrival of the beam tracking responder's feedback may be indicated by the PHY-RXEND.indication primitive of the PPDU that contains the BRP MAC Management Protocol Data Unit (MMPDU).

In some demonstrative embodiments, the time of transmit completion of the beam tracking initiator's PPDU may be indicated by the PHY-TXEND.confirm primitive.

In some demonstrative embodiments, the beam tracking responder shall not transmit a BRP frame with feedback to the beam tracking initiator if the time period between PHY-RXEND.indication primitive of the PPDU that contains the beam tracking request and of PHY-TXEND.confirm primitive of the response BRP frame is longer than dot11BeamTrackingTimeLimit.

Figure 4:
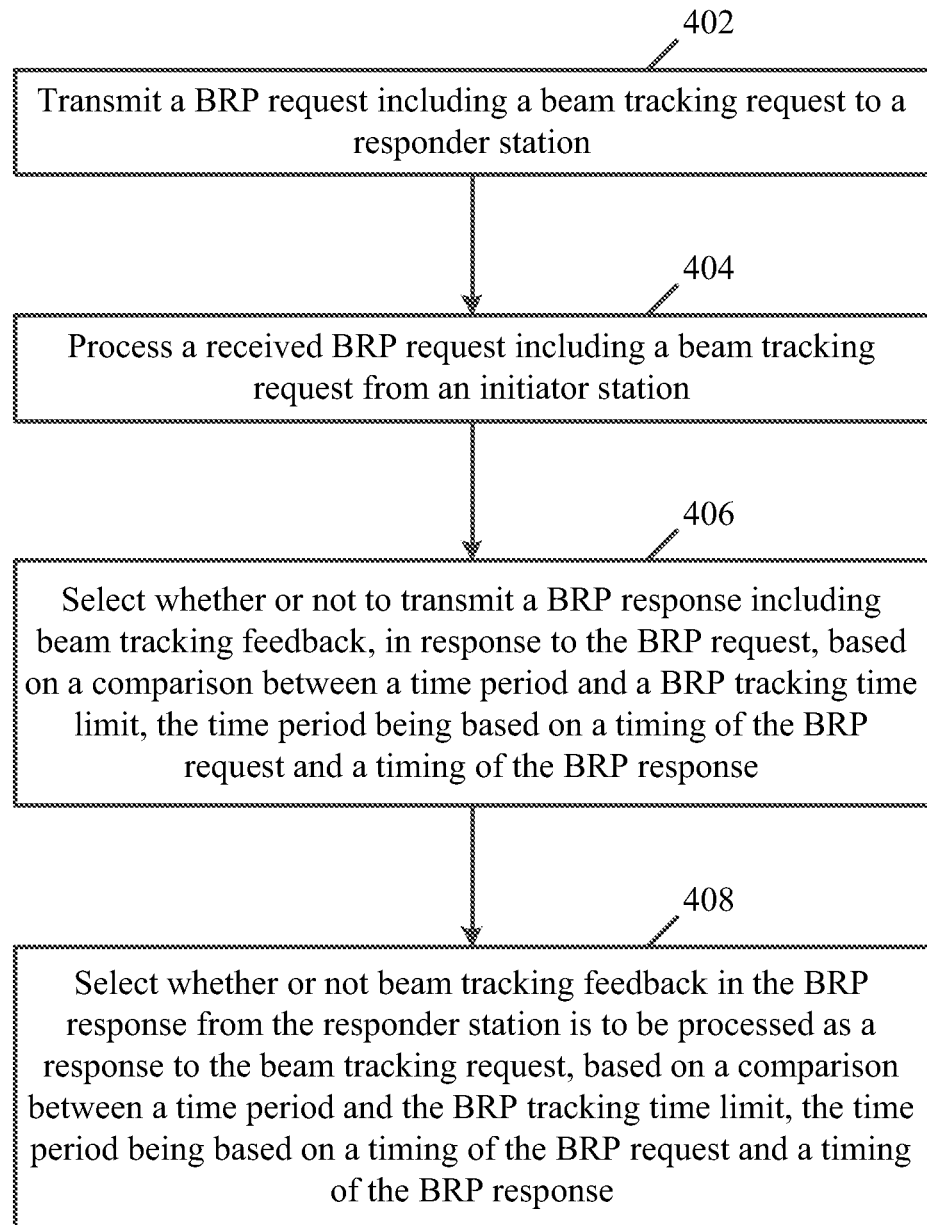
FIG. 4 is a schematic flow-chart illustration of a method of beamforming, in accordance with some demonstrative embodiments.

Reference is made to FIG. 4, which schematically illustrates a method of beamforming, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include transmitting a BRP request including a beam tracking request to a responder station. For example, controller 124 (FIG. 1) may cause device 102 (FIG. 1) to transmit the BRP request, e.g., as described above.

As indicated at block 404, the method may include processing a received BRP request including a beam tracking request from an initiator station. For example, controller 154 (FIG. 1) may cause device 140 (FIG. 1) to process reception of the BRP request, e.g., as described above.

As indicated at block 406, the method may include selecting whether or not to transmit a BRP response including beam tracking feedback, in response to the BRP request, based on a comparison between a time period and a BRP tracking time limit, the time period being based on a timing of the BRP request and a timing of the BRP response. For example, controller 154 (FIG. 1) may cause device 140 (FIG. 1) to select whether or not to transmit the BRP response, for example, based on the BRP tracking time limit, e.g., as described above.

As indicated at block 408, the method may include selecting whether or not beam tracking feedback in the BRP response from the responder station is to be processed as a response to the beam tracking request, based on a comparison between a time period and the BRP tracking time limit, the time period being based on a timing of the BRP request and a timing of the BRP response. For example, controller 124 (FIG. 1) may cause device 102 (FIG. 1) to select whether or not to process the beam tracking feedback in the BRP response, for example, based on the BRP tracking time limit, e.g., as described above.

Figure 5:
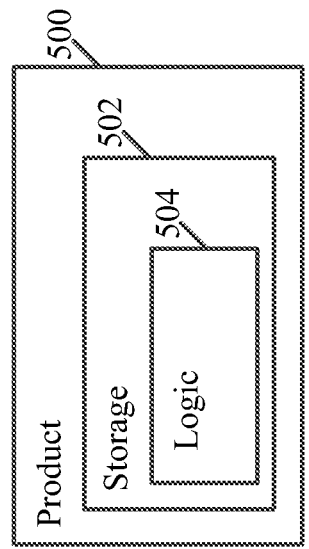
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of devices 102 and/or 140 (FIG. 1), transmitters 118 and/or 148 (FIG. 1), receivers 116 and/or 146 (FIG. 1), controllers 124 and/or 154 (FIG. 1), and/or message processors 128 (FIG. 1) and/or 158 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a responder station to process a received Beam Refinement Protocol (BRP) request comprising a beam tracking request from an initiator station; and select whether or not to transmit a BRP response comprising beam tracking feedback, in response to the BRP request, based on a comparison between a time period and a BRP tracking time limit, the time period being based on a timing of the BRP request and a timing of the BRP response.

Example 2 includes the subject mater of Example 1, and optionally, being configured to cause the responder station to transmit the BRP response, when the time period is equal to or less than the BRP tracking time limit.

Example 3 includes the subject mater of Example 1 or 2, and optionally, being configured to cause the responder station to select not to transmit the BRP response, when the time period is longer than the BRP tracking time limit.

Example 4 includes the subject mater of any one of Examples 1-3, and optionally, being configured to cause the responder station to determine the BRP tracking time limit based at least on a BRP tracking time limit value transmitted by the responder station.

Example 5 includes the subject mater of any one of Examples 1-4, and optionally, being configured to cause the responder station to determine the BRP tracking time limit based at least on a BRP tracking time limit value received from the initiator station.

Example 6 includes the subject mater of any one of Examples 1-5, and optionally, being configured to cause the responder station to negotiate the BRP tracking time limit with the initiator station.

Example 7 includes the subject mater of any one of Examples 1-6, and optionally, being configured to cause the responder station to transmit a first capabilities element comprising a first BRP tracking time limit value, to process a second capabilities element comprising a second BRP tracking time limit value from the initiator station, and to determine the BRP tracking time limit based on the first and second BRP tracking time limit values.

Example 8 includes the subject mater of Example 7, and optionally, being configured to cause the responder station to determine the BRP tracking time limit based on a comparison between the first and second BRP tracking time limit values.

Example 9 includes the subject mater of any one of Examples 1-8, and optionally, wherein the timing of the BRP request is based on a Physical Layer (PHY) Receive (Rx) end (PHY-RXEND) indication primitive of the BRP request.

Example 10 includes the subject mater of any one of Examples 1-9, and optionally, wherein the timing of the BRP response is based on a Physical Layer (PHY) Transmit (Tx) end (PHY-TXEND) indication primitive of the BRP response.

Example 11 includes the subject mater of any one of Examples 1-10, and optionally, wherein the responder station is a Directional Multi-Gigabit (DMG) Station (STA).

Example 12 includes the subject mater of any one of Examples 1-11, and optionally, comprising a radio to receive the BRP request and to transmit the BRP response.

Example 13 includes the subject mater of any one of Examples 1-12, and optionally, comprising one or more antennas, a memory and a processor.

Example 14 includes an apparatus comprising circuitry configured to cause an initiator station to transmit a Beam Refinement Protocol (BRP) request comprising a beam tracking request to a responder station; and select whether or not beam tracking feedback in a BRP response from the responder station is to be processed as a response to the beam tracking request, based on a comparison between a time period and a BRP tracking time limit, the time period being based on a timing of the BRP request and a timing of the BRP response.

Example 15 includes the subject mater of Example 14, and optionally, being configured to cause the initiator station to transmit the BRP request if at least one of the following conditions is met: a time duration since transmission of a last BRP request to the responder station is greater than a sum of the BRP tracking time limit and a beam refinement protocol inter-frame space (BRPIFS); and a previous BRP response was received from the responder station.

Example 16 includes the subject mater of Example 14 or 15, and optionally, being configured to cause the initiator station to process the feedback in the BRP response, when the time period is less than the BRP tracking time limit.

Example 17 includes the subject mater of Example 14 or 15, and optionally, being configured to cause the initiator station to select to ignore the feedback in the BRP response, when the time period is equal to or greater than the BRP tracking time limit.

Example 18 includes the subject mater of any one of Examples 14-17, and optionally, being configured to cause the initiator station to determine a failure of the beam tracking request, when the BRP response is not received within the BRP tracking time limit.

Example 19 includes the subject mater of any one of Examples 14-18, and optionally, being configured to cause the initiator station to determine the BRP tracking time limit based at least on a BRP tracking time limit value transmitted by the initiator station.

Example 20 includes the subject mater of any one of Examples 14-19, and optionally, being configured to cause the initiator station to determine the BRP tracking time limit based at least on a BRP tracking time limit value received from the responder station.

Example 21 includes the subject mater of any one of Examples 14-20, and optionally, being configured to cause the initiator station to negotiate the BRP tracking time limit with the responder station.

Example 22 includes the subject mater of any one of Examples 14-21, and optionally, being configured to cause the initiator station to transmit a first capabilities element comprising a first BRP tracking time limit value, to process a second capabilities element comprising a second BRP tracking time limit value from the responder station, and to determine the BRP tracking time limit based on the first and second BRP tracking time limit values.

Example 23 includes the subject mater of Example 22, and optionally, being configured to cause the initiator station to determine the BRP tracking time limit based on a comparison between the first and second BRP tracking time limit values.

Example 24 includes the subject mater of any one of Examples 14-23, and optionally, wherein the timing of the BRP request is based on a Physical Layer (PHY) Transmit (Tx) end (PHY-TXEND) indication primitive of the BRP request.

Example 25 includes the subject mater of any one of Examples 14-24, and optionally, wherein the timing of the BRP response is based on a Physical Layer (PHY) Receive (Rx) end (PHY-RXEND) indication primitive of the BRP response.

Example 26 includes the subject mater of any one of Examples 14-25, and optionally, wherein the responder station is a Directional Multi-Gigabit (DMG) Station (STA).

Example 27 includes the subject mater of any one of Examples 14-26, and optionally, comprising a radio to transmit the BRP request and to receive the BRP response.

Example 28 includes the subject mater of any one of Examples 14-27, and optionally, comprising one or more antennas, a memory and a processor.

Example 29 includes a method to be performed at a responder station, the method comprising processing a received Beam Refinement Protocol (BRP) request comprising a beam tracking request from an initiator station; and selecting whether or not to transmit a BRP response comprising beam tracking feedback, in response to the BRP request, based on a comparison between a time period and a BRP tracking time limit, the time period being based on a timing of the BRP request and a timing of the BRP response.

Example 30 includes the subject mater of Example 29, and optionally, comprising transmitting the BRP response, when the time period is equal to or less than the BRP tracking time limit.

Example 31 includes the subject mater of Example 29 or 30, and optionally, comprising selecting not to transmit the BRP response, when the time period is longer than the BRP tracking time limit.

Example 32 includes the subject mater of any one of Examples 29-31, and optionally, comprising determining the BRP tracking time limit based at least on a BRP tracking time limit value transmitted by the responder station.

Example 33 includes the subject mater of any one of Examples 29-32, and optionally, comprising determining the BRP tracking time limit based at least on a BRP tracking time limit value received from the initiator station.

Example 34 includes the subject mater of any one of Examples 29-33, and optionally, comprising negotiating the BRP tracking time limit with the initiator station.

Example 35 includes the subject mater of any one of Examples 29-34, and optionally, comprising transmitting a first capabilities element comprising a first BRP tracking time limit value, processing a second capabilities element comprising a second BRP tracking time limit value from the initiator station, and determining the BRP tracking time limit based on the first and second BRP tracking time limit values.

Example 36 includes the subject mater of Example 35, and optionally, comprising determining the BRP tracking time limit based on a comparison between the first and second BRP tracking time limit values.

Example 37 includes the subject mater of any one of Examples 29-36, and optionally, wherein the timing of the BRP request is based on a Physical Layer (PHY) Receive (Rx) end (PHY-RXEND) indication primitive of the BRP request.

Example 38 includes the subject mater of any one of Examples 29-37, and optionally, wherein the timing of the BRP response is based on a Physical Layer (PHY) Transmit (Tx) end (PHY-TXEND) indication primitive of the BRP response.

Example 39 includes the subject mater of any one of Examples 29-38, and optionally, wherein the responder station is a Directional Multi-Gigabit (DMG) Station (STA).

Example 40 includes a product comprising one or more tangible computer-readable non-transitory storage media comprising computer-executable instructions operable to, when executed by at least one computer processor, enable the at least one computer processor to implement one or more operations at a responder station, the operations comprising processing a received Beam Refinement Protocol (BRP) request comprising a beam tracking request from an initiator station; and selecting whether or not to transmit a BRP response comprising beam tracking feedback, in response to the BRP request, based on a comparison between a time period and a BRP tracking time limit, the time period being based on a timing of the BRP request and a timing of the BRP response.

Example 41 includes the subject mater of Example 40, and optionally, wherein the operations comprise transmitting the BRP response, when the time period is equal to or less than the BRP tracking time limit.

Example 42 includes the subject mater of Example 40 or 41, and optionally, wherein the operations comprise selecting not to transmit the BRP response, when the time period is longer than the BRP tracking time limit.

Example 43 includes the subject mater of any one of Examples 40-42, and optionally, wherein the operations comprise determining the BRP tracking time limit based at least on a BRP tracking time limit value transmitted by the responder station.

Example 44 includes the subject mater of any one of Examples 40-43, and optionally, wherein the operations comprise determining the BRP tracking time limit based at least on a BRP tracking time limit value received from the initiator station.

Example 45 includes the subject mater of any one of Examples 40-44, and optionally, wherein the operations comprise negotiating the BRP tracking time limit with the initiator station.

Example 46 includes the subject mater of any one of Examples 40-45, and optionally, wherein the operations comprise transmitting a first capabilities element comprising a first BRP tracking time limit value, processing a second capabilities element comprising a second BRP tracking time limit value from the initiator station, and determining the BRP tracking time limit based on the first and second BRP tracking time limit values.

Example 47 includes the subject mater of Example 46, and optionally, wherein the operations comprise determining the BRP tracking time limit based on a comparison between the first and second BRP tracking time limit values.

Example 48 includes the subject mater of any one of Examples 40-47, and optionally, wherein the timing of the BRP request is based on a Physical Layer (PHY) Receive (Rx) end (PHY-RXEND) indication primitive of the BRP request.

Example 49 includes the subject mater of any one of Examples 40-48, and optionally, wherein the timing of the BRP response is based on a Physical Layer (PHY) Transmit (Tx) end (PHY-TXEND) indication primitive of the BRP response.

Example 50 includes the subject mater of any one of Examples 40-49, and optionally, wherein the responder station is a Directional Multi-Gigabit (DMG) Station (STA).

Example 51 includes an apparatus of wireless communication by a responder station, the apparatus comprising means for processing a received Beam Refinement Protocol (BRP) request comprising a beam tracking request from an initiator station; and means for selecting whether or not to transmit a BRP response comprising beam tracking feedback, in response to the BRP request, based on a comparison between a time period and a BRP tracking time limit, the time period being based on a timing of the BRP request and a timing of the BRP response.

Example 52 includes the subject mater of Example 51, and optionally, comprising means for transmitting the BRP response, when the time period is equal to or less than the BRP tracking time limit.

Example 53 includes the subject mater of Example 51 or 52, and optionally, comprising means for selecting not to transmit the BRP response, when the time period is longer than the BRP tracking time limit.

Example 54 includes the subject mater of any one of Examples 51-53, and optionally, comprising means for determining the BRP tracking time limit based at least on a BRP tracking time limit value transmitted by the responder station.

Example 55 includes the subject mater of any one of Examples 51-54, and optionally, comprising means for determining the BRP tracking time limit based at least on a BRP tracking time limit value received from the initiator station.

Example 56 includes the subject mater of any one of Examples 51-55, and optionally, comprising means for negotiating the BRP tracking time limit with the initiator station.

Example 57 includes the subject mater of any one of Examples 51-56, and optionally, comprising means for transmitting a first capabilities element comprising a first BRP tracking time limit value, processing a second capabilities element comprising a second BRP tracking time limit value from the initiator station, and determining the BRP tracking time limit based on the first and second BRP tracking time limit values.

Example 58 includes the subject mater of Example 57 comprising means for determining the BRP tracking time limit based on a comparison between the first and second BRP tracking time limit values.

Example 59 includes the subject mater of any one of Examples 51-58, and optionally, wherein the timing of the BRP request is based on a Physical Layer (PHY) Receive (Rx) end (PHY-RXEND) indication primitive of the BRP request.

Example 60 includes the subject mater of any one of Examples 51-59, and optionally, wherein the timing of the BRP response is based on a Physical Layer (PHY) Transmit (Tx) end (PHY-TXEND) indication primitive of the BRP response.

Example 61 includes the subject mater of any one of Examples 51-60, and optionally, wherein the responder station is a Directional Multi-Gigabit (DMG) Station (STA).

Example 62 includes a method to be performed at an initiator station, the method comprising transmitting a Beam Refinement Protocol (BRP) request comprising a beam tracking request to a responder station; and selecting whether or not beam tracking feedback in a BRP response from the responder station is to be processed as a response to the beam tracking request, based on a comparison between a time period and a BRP tracking time limit, the time period being based on a timing of the BRP request and a timing of the BRP response.

Example 63 includes the subject mater of Example 62, and optionally, comprising transmitting the BRP request if at least one of the following conditions is met: a time duration since transmission of a last BRP request to the responder station is greater than a sum of the BRP tracking time limit and a beam refinement protocol inter-frame space (BRPIFS); and a previous BRP response was received from the responder station.

Example 64 includes the subject mater of Example 62 or 63, and optionally, comprising processing the feedback in the BRP response, when the time period is less than the BRP tracking time limit.

Example 65 includes the subject mater of Example 62 or 63, and optionally, comprising selecting to ignore the feedback in the BRP response, when the time period is equal to or greater than the BRP tracking time limit.

Example 66 includes the subject mater of any one of Examples 62-65, and optionally, comprising determining a failure of the beam tracking request, when the BRP response is not received within the BRP tracking time limit.

Example 67 includes the subject mater of any one of Examples 62-66, and optionally, comprising determining the BRP tracking time limit based at least on a BRP tracking time limit value transmitted by the initiator station.

Example 68 includes the subject mater of any one of Examples 62-67, and optionally, comprising determining the BRP tracking time limit based at least on a BRP tracking time limit value received from the responder station.

Example 69 includes the subject mater of any one of Examples 62-68 comprising negotiating the BRP tracking time limit with the responder station.

Example 70 includes the subject mater of any one of Examples 62-69, and optionally, comprising transmitting a first capabilities element comprising a first BRP tracking time limit value, processing a second capabilities element comprising a second BRP tracking time limit value from the responder station, and determining the BRP tracking time limit based on the first and second BRP tracking time limit values.

Example 71 includes the subject mater of Example 70, and optionally, comprising determining the BRP tracking time limit based on a comparison between the first and second BRP tracking time limit values.

Example 72 includes the subject mater of any one of Examples 62-71, and optionally, wherein the timing of the BRP request is based on a Physical Layer (PHY) Transmit (Tx) end (PHY-TXEND) indication primitive of the BRP request.

Example 73 includes the subject mater of any one of Examples 62-72, and optionally, wherein the timing of the BRP response is based on a Physical Layer (PHY) Receive (Rx) end (PHY-RXEND) indication primitive of the BRP response.

Example 74 includes the subject mater of any one of Examples 62-73, and optionally, wherein the responder station is a Directional Multi-Gigabit (DMG) Station (STA).

Example 75 includes a product comprising one or more tangible computer-readable non-transitory storage media comprising computer-executable instructions operable to, when executed by at least one computer processor, enable the at least one computer processor to implement one or more operations at an initiator station, the operations comprising transmitting a Beam Refinement Protocol (BRP) request comprising a beam tracking request to a responder station; and selecting whether or not beam tracking feedback in a BRP response from the responder station is to be processed as a response to the beam tracking request, based on a comparison between a time period and a BRP tracking time limit, the time period being based on a timing of the BRP request and a timing of the BRP response.

Example 76 includes the subject mater of Example 75, and optionally, wherein the operations comprise transmitting the BRP request if at least one of the following conditions is met: a time duration since transmission of a last BRP request to the responder station is greater than a sum of the BRP tracking time limit and a beam refinement protocol inter-frame space (BRPIFS); and a previous BRP response was received from the responder station.

Example 77 includes the subject mater of Example 75 or 76, and optionally, wherein the operations comprise processing the feedback in the BRP response, when the time period is less than the BRP tracking time limit.

Example 78 includes the subject mater of Example 75 or 76, and optionally, wherein the operations comprise selecting to ignore the feedback in the BRP response, when the time period is equal to or greater than the BRP tracking time limit.

Example 79 includes the subject mater of any one of Examples 75-78, and optionally, wherein the operations comprise determining a failure of the beam tracking request, when the BRP response is not received within the BRP tracking time limit.

Example 80 includes the subject mater of any one of Examples 75-79, and optionally, wherein the operations comprise determining the BRP tracking time limit based at least on a BRP tracking time limit value transmitted by the initiator station.

Example 81 includes the subject mater of any one of Examples 75-80, and optionally, wherein the operations comprise determining the BRP tracking time limit based at least on a BRP tracking time limit value received from the responder station.

Example 82 includes the subject mater of any one of Examples 75-81, and optionally, wherein the operations comprise negotiating the BRP tracking time limit with the responder station.

Example 83 includes the subject mater of any one of Examples 75-82, and optionally, wherein the operations comprise transmitting a first capabilities element comprising a first BRP tracking time limit value, processing a second capabilities element comprising a second BRP tracking time limit value from the responder station, and determining the BRP tracking time limit based on the first and second BRP tracking time limit values.

Example 84 includes the subject mater of Example 83, and optionally, wherein the operations comprise determining the BRP tracking time limit based on a comparison between the first and second BRP tracking time limit values.

Example 85 includes the subject mater of any one of Examples 75-84, and optionally, wherein the timing of the BRP request is based on a Physical Layer (PHY) Transmit (Tx) end (PHY-TXEND) indication primitive of the BRP request.

Example 86 includes the subject mater of any one of Examples 75-85, and optionally, wherein the timing of the BRP response is based on a Physical Layer (PHY) Receive (Rx) end (PHY-RXEND) indication primitive of the BRP response.

Example 87 includes the subject mater of any one of Examples 75-86, and optionally, wherein the responder station is a Directional Multi-Gigabit (DMG) Station (STA).

Example 88 includes an apparatus of wireless communication by an initiator station, the apparatus comprising means for transmitting a Beam Refinement Protocol (BRP) request comprising a beam tracking request to a responder station; and means for selecting whether or not beam tracking feedback in a BRP response from the responder station is to be processed as a response to the beam tracking request, based on a comparison between a time period and a BRP tracking time limit, the time period being based on a timing of the BRP request and a timing of the BRP response.

Example 89 includes the subject mater of Example 88, and optionally, comprising means for transmitting the BRP request if at least one of the following conditions is met: a time duration since transmission of a last BRP request to the responder station is greater than a sum of the BRP tracking time limit and a beam refinement protocol inter-frame space (BRPIFS); and a previous BRP response was received from the responder station.

Example 90 includes the subject mater of Example 88 or 89, and optionally, comprising means for processing the feedback in the BRP response, when the time period is less than the BRP tracking time limit.

Example 91 includes the subject mater of Example 88 or 89, and optionally, comprising means for selecting to ignore the feedback in the BRP response, when the time period is equal to or greater than the BRP tracking time limit.

Example 92 includes the subject mater of any one of Examples 88-91, and optionally, comprising means for determining a failure of the beam tracking request, when the BRP response is not received within the BRP tracking time limit.

Example 93 includes the subject mater of any one of Examples 88-92, and optionally, comprising means for determining the BRP tracking time limit based at least on a BRP tracking time limit value transmitted by the initiator station.

Example 94 includes the subject mater of any one of Examples 88-93, and optionally, comprising means for determining the BRP tracking time limit based at least on a BRP tracking time limit value received from the responder station.

Example 95 includes the subject mater of any one of Examples 88-94, and optionally, comprising means for negotiating the BRP tracking time limit with the responder station.

Example 96 includes the subject mater of any one of Examples 88-95, and optionally, comprising means for transmitting a first capabilities element comprising a first BRP tracking time limit value, processing a second capabilities element comprising a second BRP tracking time limit value from the responder station, and determining the BRP tracking time limit based on the first and second BRP tracking time limit values.

Example 97 includes the subject mater of Example 96, and optionally, comprising means for determining the BRP tracking time limit based on a comparison between the first and second BRP tracking time limit values.

Example 98 includes the subject mater of any one of Examples 88-97, and optionally, wherein the timing of the BRP request is based on a Physical Layer (PHY) Transmit (Tx) end (PHY-TXEND) indication primitive of the BRP request.

Example 99 includes the subject mater of any one of Examples 88-98, and optionally, wherein the timing of the BRP response is based on a Physical Layer (PHY) Receive (Rx) end (PHY-RXEND) indication primitive of the BRP response.

Example 100 includes the subject mater of any one of Examples 88-99, and optionally, wherein the responder station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:
1. An apparatus comprising:
memory circuitry; and
a processor comprising logic and circuitry configured to cause a beam tracking responder wireless communication station (STA) to:

determine a beam tracking time limit based on a first time limit value and a second time limit value, the first time limit value comprising a value in a beam tracking time limit field from a beam tracking initiator STA, the second time limit value corresponding to the beam tracking responder STA;

process a Physical layer (PHY) Protocol Data Unit (PPDU) from the beam tracking initiator STA, the PPDU comprising a beam tracking request; and based on a comparison between a time period and the beam tracking time limit, select whether to allow the beam tracking responder STA to transmit a Beam Refinement Protocol (BRP) frame comprising feedback to the beam tracking initiator STA, the time period is between a first time and a second time, the first time corresponding to the PPDU and the second time corresponding to the BRP frame.

2. The apparatus of claim 1 configured to prohibit the beam tracking responder STA to transmit the BRP frame, based on a determination that the time period is longer than the beam tracking time limit.

3. The apparatus of claim 1 configured to allow the beam tracking responder STA to transmit the BRP frame, based on a determination that the time period is no longer than the beam tracking time limit.

4. The apparatus of claim 1, wherein the time period is between a PHY Receive (Rx) end indication (PHY-RXEND.indication) primitive of the PPDU and a PHY Transmit (Tx) end confirm (PHY-TXEND.confirm) primitive of the BRP frame.

5. The apparatus of claim 1 configured to cause the beam tracking responder STA to determine the beam tracking time limit based on a comparison between the first time limit value and the second time limit value.

6. The apparatus of claim 1 configured to cause the beam tracking responder STA to determine the beam tracking time limit according to the first time limit value, based on a determination that the first time limit value is greater than 0 and less than 65535, the second time limit value is greater than 0 and less than 65535, and the first time limit value is equal to or greater than the second time limit value.

7. The apparatus of claim 1 configured to cause the beam tracking responder STA to determine the beam tracking time limit according to the second time limit value, based on a determination that the first time limit value is greater than 0 and less than 65535, the second time limit value is greater than 0 and less than 65535, and the second time limit value is greater than the first time limit value.

8. The apparatus of claim 1 configured to cause the beam tracking responder STA to determine the beam tracking time limit according to the first time limit value, based on a determination that the first time limit value is greater than 0 and less than 65535, and the second time limit value is 65535.

9. The apparatus of claim 1 configured to cause the beam tracking responder STA to determine the beam tracking time limit according to the second time limit value, based on a determination that the first time limit value is 65535, and the second time limit value is greater than 0 and less than 65535.

10. The apparatus of claim 1 configured to cause the beam tracking responder STA to determine the beam tracking time limit according to a default time limit value, based on a determination that the first time limit value is 65535 and the second time limit value is 65535.

11. The apparatus of claim 1, wherein the beam tracking time limit field is in a Directional Multi-Gigabit (DMG) capabilities element from the beam tracking initiator STA.

12. The apparatus of claim 1, wherein the beam tracking time limit field has a size of two octets.

13. The apparatus of claim 1, wherein the beam tracking responder STA comprises a Directional Multi-Gigabit (DMG) STA.

14. The apparatus of claim 1 comprising a radio, the processor configured to cause the radio to transmit the BRP frame.

15. The apparatus of claim 14 comprising one or more antennas connected to the radio, and another processor to execute instructions of an operating system.

16. A product comprising one or more tangible computer-readable non-transitory storage media comprising computer-executable instructions operable to, when executed by at least one processor, enable the at least one processor to cause a beam tracking responder wireless communication station (STA) to:

determine a beam tracking time limit based on a first time limit value and a second time limit value, the first time limit value comprising a value in a beam tracking time limit field from a beam tracking initiator STA, the second time limit value corresponding to the beam tracking responder STA;

process a Physical layer (PHY) Protocol Data Unit (PPDU) from the beam tracking initiator STA, the PPDU comprising a beam tracking request; and based on a comparison between a time period and the beam tracking time limit, select whether to allow the beam tracking responder STA to transmit a Beam Refinement Protocol (BRP) frame comprising feedback to the beam tracking initiator STA, the time period is between a first time and a second time, the first time corresponding to the PPDU and the second time corresponding to the BRP frame.

17. The product of claim 16, wherein the instructions, when executed, prohibit the beam tracking responder STA to transmit the BRP frame, based on a determination that the time period is longer than the beam tracking time limit.

18. The product of claim 16, wherein the instructions, when executed, allow the beam tracking responder STA to transmit the BRP frame, based on a determination that the time period is no longer than the beam tracking time limit.

19. The product of claim 16, wherein the time period is between a PHY Receive (Rx) end indication (PHY-RXEND.indication) primitive of the PPDU and a PHY Transmit (Tx) end confirm (PHY-TXEND.confirm) primitive of the BRP frame.

20. An apparatus for a beam tracking responder wireless communication station (STA), the apparatus comprising:

means for determining a beam tracking time limit based on a first time limit value and a second time limit value, the first time limit value comprising a value in a beam tracking time limit field from a beam tracking initiator STA, the second time limit value corresponding to the beam tracking responder STA;

means for processing a Physical layer (PHY) Protocol Data Unit (PPDU) from the beam tracking initiator STA, the PPDU comprising a beam tracking request; and means for selecting, based on a comparison between a time period and the beam tracking time limit, whether to allow the beam tracking responder STA to transmit a Beam Refinement Protocol (BRP) frame comprising feedback to the beam tracking initiator STA, the time period is between a first time and a second time, the first time corresponding to the PPDU and the second time corresponding to the BRP frame.

21. The apparatus of claim 20, wherein the time period is between a PHY Receive (Rx) end indication (PHY-RXEND.indication) primitive of the PPDU and a PHY Transmit (Tx) end confirm (PHY-TXEND.confirm) primitive of the BRP frame.

\* \* \* \* \*

UNITED STATES PATENT AND TRADEMARK OFFICE
CERTIFICATE OF CORRECTION

| | |
|---|---|
| PATENT NO. | : 11,784,701 B2 |
| APPLICATION NO. | : 17/120483 |
| DATED | : October 10, 2023 |
| INVENTOR(S) | : Solomon B. Trainin et al. |

It is certified that error appears in the above-identified patent and that said Letters Patent is hereby corrected as shown below:

On the Title Page

Item (71), delete "INTEL IP CORPORATION, Santa Clara, CA (US)" and insert -- INTEL CORPORATION, Santa Clara, CA (US) --, therefor Signed and Sealed this
Twenty-fifth Day of June, 2024

Katherine Kelly Vidal
*Director of the United States Patent and Trademark Office*